No. 618,611. Patented Jan. 31, 1899.
A. L. PALMER.
DEVICE FOR TEACHING MUSICAL NOTATION.
(Application filed July 8, 1897.)
(No Model.)

Witnesses:
G. A. Pennington
F. R. Cornwall

Inventor:
Annie L. Palmer
by Paul Bakewell
her atty

UNITED STATES PATENT OFFICE.

ANNIE L. PALMER, OF CHICAGO, ILLINOIS.

DEVICE FOR TEACHING MUSICAL NOTATION.

SPECIFICATION forming part of Letters Patent No. 618,611, dated January 31, 1899.

Application filed July 8, 1897. Serial No. 643,800. (No model.)

*To all whom it may concern:*

Be it known that I, ANNIE L. PALMER, a citizen of the United States, residing in the city of Chicago, in the county of Cook, State of Illinois, have invented a certain new and useful Improvement in Devices for Teaching Musical Notation, of which the following is a full, clear, and exact description, reference being had to the accompanying drawings, forming part of this specification, wherein—

Figure 1:
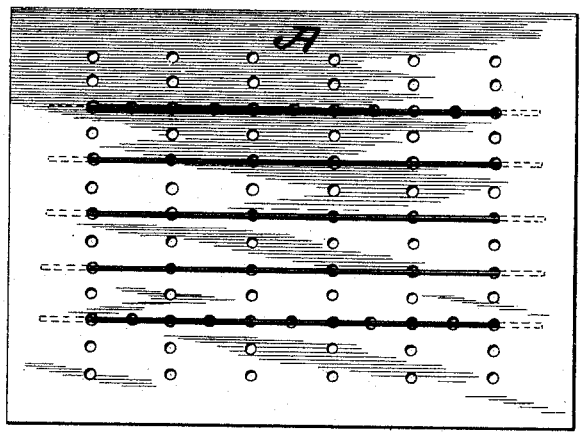
Figure 4:
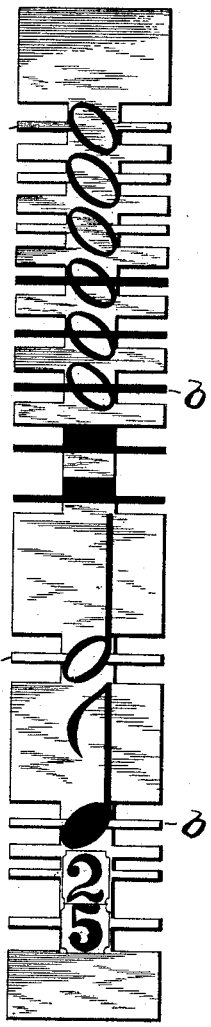
Figure 2:
Figure 3:
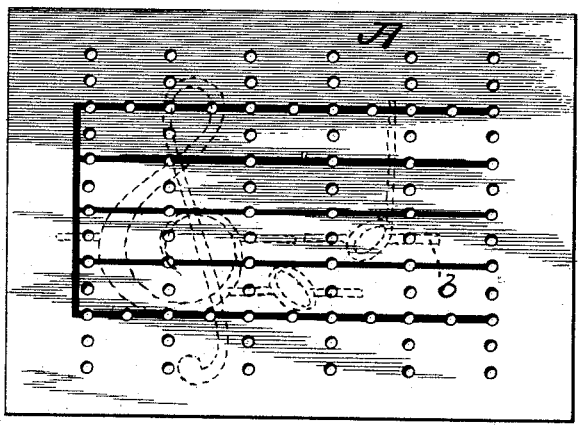
Figure 5:
Figure 6:
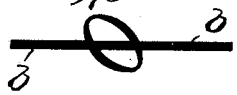

Figure 1 is a plan view of the base-board, illustrating the reverse side of the same. Fig. 2 is a sectional view therethrough. Fig. 3 is a plan view of the board, showing some of the musical characters in dotted lines. Fig. 4 is a strip of musical characters which are adapted to be cut out and placed in position on the board. Figs. 5 and 6 are detail views of characters cut from said strip.

This invention relates to a certain new and useful improvement in devices for teaching musical notation; and it consists in the construction, arrangement, and combination of the several parts of my device, all as will hereinafter be more fully described and afterward pointed out in the claims.

The object of my present invention is to provide a simple and inexpensive device for use in kindergarten and primary schools for teaching musical notation, the material of which the base-board and characters are composed being preferably stiff paper or other suitable material sufficiently flexible to be bent easily. The base-board and sufficient numbers of characters are stamped out and given to the pupil. The first object is to explain the staff, comprising five lines and four spaces, which are illustrated by threading blackened strips of paper through the plain or back side of the base-board, as shown in Figs. 1 and 2. After this is done the board is reversed. A staff having been printed on this side corresponding to the staff made by the pupil characters are arranged on this printed staff by inserting flexible projecting ends of said characters into openings or perforations formed in the board, as shown by dotted lines in Fig. 3. Thus by the use of skeleton musical characters lessons may be easily taught and any combination of notes may be made as desired.

In addition to the musical characters figures and lines may also be employed in connection with the notes to designate their character, value, and name and their position on the staff.

In the drawings, A indicates a suitable baseboard, which is formed with openings or perforations arranged in vertical and horizontal series, as shown. The back of this board is plain or unprinted, so as to permit the introduction of blackened strips, which are threaded through the perforations with a view of teaching the objects and uses of the five lines and four spaces composing the staff. The face of this board is printed with a staff, as shown in Fig. 3. I have illustrated a strip of attached or connected musical characters in Fig. 4, which are designed to be cut out by the person who is to attach them to the board. These characters may be of any number and represent notes, rests, &c., of different value. Each character has extended from it two or more tongues or projections *b* of a width less than the size of the openings or perforations in the board. After the characters have been cut out, as shown in Figs. 5 and 6, they are then placed in position on the board by introducing the tongues or projections *b* into the openings, as shown in dotted lines in Fig. 3. These tongues are located at diametrically opposite points on the character, and each being inserted through an opening in the board holds the note or other character in position and prevents its displacement.

I am aware that many minor changes in the combination, arrangement, and construction of the several parts of my device can be made and substituted for those herein shown and described without in the least departing from the nature and principle of the invention.

Having thus described my invention, what I claim, and desire to secure by Letters Patent, is—

1. In a device for teaching musical notation, the combination with a thin sheet having represented thereon a musical staff, and provided with a series of horizontal rows of perforations, of a musical character formed of a flexible piece of material with portions thereof at opposite sides of the character projecting out and forming oppositely-extending tongues, adapted by the buckling of the character and tongues to be inserted in the perforations of said sheet for holding the character in adjusted positions.

2. The combination with a sheet of paper-board provided with a vertical and horizontal series of perforations and having one side plain and on the other side the representation of a musical staff, of musical characters cut from paper-board with oppositely-arranged outwardly-projecting tongues on opposite sides thereof adapted to be inserted in the perforations in the board, substantially as and for the purpose set forth.

In testimony whereof I hereunto affix my signature, in presence of two witnesses, this 15th day of June, 1897.

ANNIE L. PALMER.

Witnesses:
F. R. CORNWALL,
HUGH K. WAGNER.